March 8, 1960 P. E. LIGHTY 2,928,030
SEMICONDUCTOR DEVICES
Filed June 7, 1954

INVENTOR
PAUL E. LIGHTY
BY Henry Kolin
AGENT

United States Patent Office 2,928,030

Patented Mar. 8, 1960

2,928,030

SEMICONDUCTOR DEVICES

Paul E. Lighty, Lafayette, N.J., assignor to International Telephone and Telegraph Corporation, Nutley, N.J., a corporation of Maryland Application June 7, 1954, Serial No. 434,865

14 Claims. (Cl. 317—234)

Figure 2:
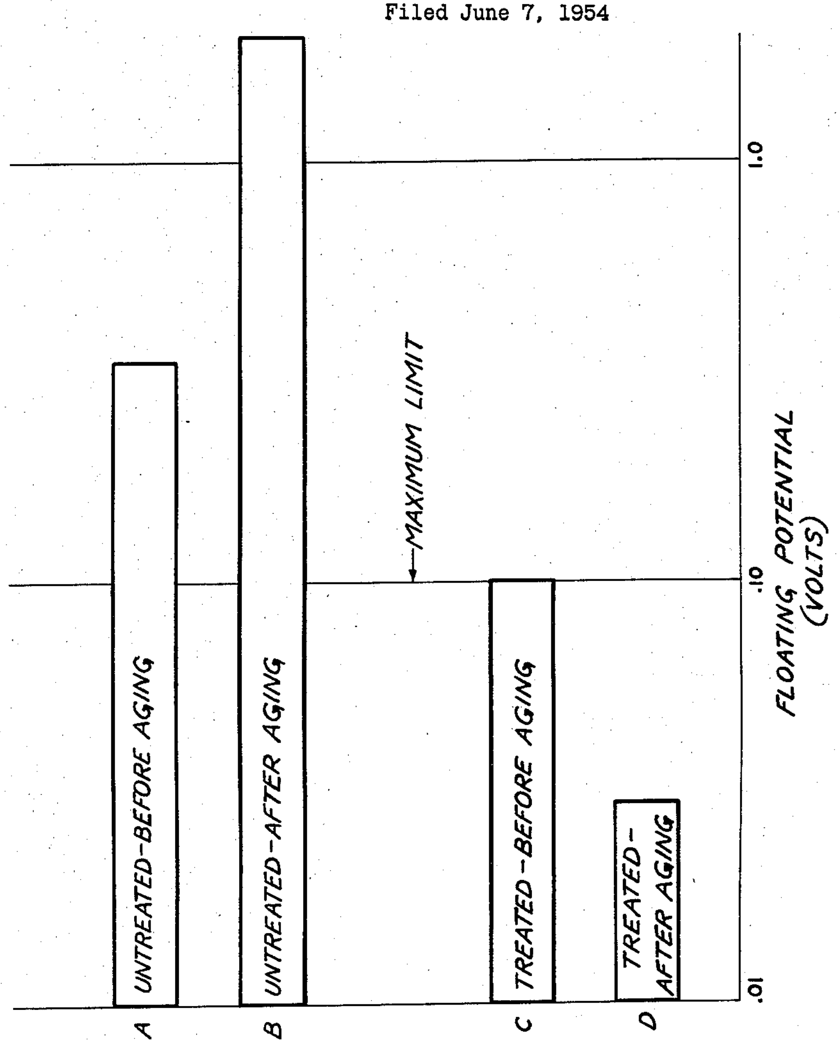

This invention relates to semiconductor devices and more particularly to a method for obtaining stable semiconductor devices whose electrical characteristics do not deteriorate substantially with time.

One of the problems encountered heretofore with semiconductor devices and particularly with such devices as germanium and silicon point-contact and junction diodes and transistors is their lack of electrical stability with time. Thus these devices appear to deteriorate in their electrical characteristics with the passage of time whether in actual operation or on shelf storage. It is believed that one of the most critical factors in the fabrication of these devices accounting for their later instability is the presence of humidity during their fabrication, resulting in adsorbed moisture on the semiconductor surface. For example, unless careful precautions are taken, ordinary humid summer conditions suffice to prevent the satisfactory fabrication of all such devices. In less extreme cases, moisture can produce or accelerate undesirable chemical reactions and lead to electrically conducting layers superposed on the semiconductor surface. It is believed that if a small amount of moisture is present on the surface of a germanium junction transistor element, the water molecule very probably ionizes and bonds itself fairly tightly to the germanium, thereby affecting the surface recombination rate of the electrons and "holes" present. A conducting film may actually be produced across the narrow junction.

To guard against the foregoing effects, various techniques have been proposed in the fabrication of semiconductor devices. For example, a so-called dry-box technique has been evolved in which critical phases of the fabrication of the semiconductor device are conducted in an air-tight enclosure containing less than 5% relative humidity. In addition, the semiconductor is impregnated with various waxes and resins to protect the semiconductor surface. Also, special treatments to stabilize the semiconductor such as immersing it in molten potassium cyanamide have been proposed. The entire unit is then frequently encapsulated in a plastic material or sealed in a glass, ceramic, or metal container. It has also been proposed to enclose the semiconductor device in a vacuum. However, while some of these techniques have been efficacious in eliminating the severest effects present and thereby improving the stability of the semiconductor device, the problem of obtaining stability because of the presence of moisture still remains as a serious one in the fabrication of these devices. It is considered probable that a tenaciously held unimolecular or thicker layer of moisture still remains on the semiconductor surface despite all the treatments used. With the passage of time, this moisture combines with the semiconductor and deteriorates its electrical characteristics.

It is accordingly a principal object of the present invention to provide a method for treating semiconductor devices so as to improve their useful life and provide stabilized electrical characteristics during such lifetime.

It is an ancillary object to so treat these devices that any residual moisture present therein is effectively eliminated.

It is still a further object to provide, by means of this process, semiconductor devices having a prolonged life and stable electrical characteristics which vary but little over the useful life of the devices.

As a principal feature of this invention a chemical substances which reacts irreversibly with moisture is provided within the semiconductor enclosure.

It is a further feature that this substance which chemically combines with moisture is present in a carrier element in a highly dispersed state.

As a preferred embodiment for the reactive material, I prefer to use an alkali metal or an alkali-metal hydride dispersed in an inert hydrocarbon-type solvent. I have found that the use of sodium dispersed in an organo-silicon liquid is particularly preferable in the practice of this invention.

Figure 1:
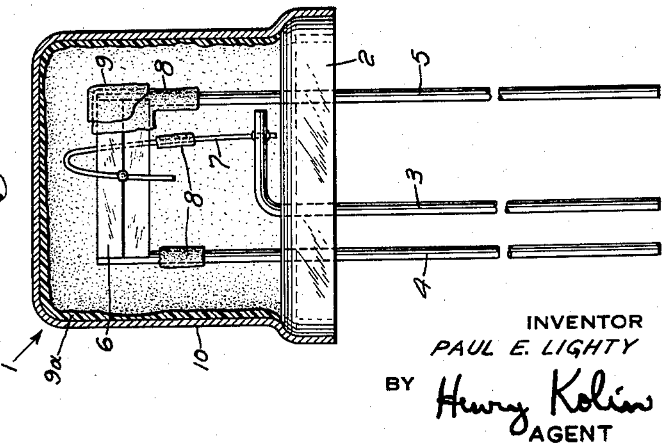

Further objects and features of this invention will best be understood from the following description when read together with the accompanying drawings wherein:

Fig. 1 is an elevational view partially in section of a semiconductor device employing the present invention; and Fig. 2 is a graphical comparison of the electrical results obtained with untreated semiconductor devices and those treated with the process of the subject invention.

It should be understood that the problem solved by the subject invention is broadly encountered in all semiconductor devices. It is particularly encountered with crystalline semiconductors such as germanium and silicon and in devices using these semiconductors such as, for example, point-contact diodes, junction diodes, point-contact transistors, grown-junction transistors, diffused-junction transistors, surface-barrier transistors and the like. While I describe with particularity the application of this method to the fabrication of a grown-junction germanium transistor device, its applicability to related semiconductor devices, such as those above enumerated, will be readily apparent to those working in this field.

Referring to Fig. 1, there is illustrated a grown-junction germanium transistor 1 found particularly suitable for treatment by the method of this invention. The grown-junction transistor 1 comprises an insulating support structure 2 in which is contained base electrode 3, emitter electrode 4 and collector electrode 5. The emitter and collector electrodes are firmly attached in an ohmic, i.e., non-rectifying manner to either end of a bar of single-crystal germanium 6 of the of the n-p-n type. As is well known to those skilled in this art, n-p-n germanium refers to germanium containing a p layer sandiwched between two n layers. Germanium of the n type contains an excess of electrons, whereas that of the p type contains a deficiency of electrons. This deficiency of electrons is frequently referred to as an excess of "holes" or effective positive charges. For the purposes of this invention, a p-n-p type germanium could obviously equally well be used. To the base electrode 3 is attached a fine gold alloy wire 7 which at its other end makes contact with the central p layer of the n-p-n crystal. The bar and gold base lead wire are preferably encapsulated in a material such as polystyrene 8. Surrounding the encapsulated bar and electrodes, is a layer 9 of sodium in a highly dispersed state. The entire unit is contained within a sealed container 10 made of a copper-zinc-nickel alloy, such as nickel silver.

While the process of preparing transistors and other semiconductor devices is still an art with considerable individual variations therein, many features of semiconductor fabrication are well known to those skilled in this art. The following steps in the process of preparing a grown-junction germanium transistor are set forth for purposes of illustration and principally to show the relation of the process of this invention to the steps in the fabrication of such devices. For example, the process of preparing an n-p-n grown-junction crystal is by now well known. One usually starts with multicrystalline zone-refined, relatively pure germanium. The germanium is then made n type by the addition thereto in the molten state of a so-called n type "doping" agent such as arsenic or antimony. An n type single crystal of germanium of the proper diameter having a volume resistivity of approximately 2 ohm-centimeters is grown from the melt to a length of approximately 1 or 2 centimeters. The molten germanium is then treated with a p type doping agent to convert it to a p type material, gallium or indium being used therefor. A p type layer is then grown next to the n type area. This p layer has a length of 0.001–0.002 inch and a resistivity of approximately 2 ohm-centimeters. The molten germanium is then heavily doped once again with an n type doping agent and an additional 1 or 2 centimeter length of n type germanium having a resistivity of approximately 0.1 ohm-centimeter or less is grown. The crystal is then sliced longitudinally into suitable widths and after evaluation of its electrical properties soldered to the nickel wires serving as the mount. The germanium bar is then etched and otherwise suitably treated, and the gold wire containing a small amount of gallium and having a diameter of approximately .001 inch is welded in place. All of the foregoing operations are preferably performed in a temperature-controlled room having a low relative humidity. After encapsulating the bar and base lead in a material such as polystyrene by a technique such as dip coating or the equivalent, the entire unit is taken to a very low humidity "dry box" immediately thereafter.

The foregoing method in its broad outlines is more or less known and practiced by those manufacturing such semiconductor devices. However, at this stage, while the semiconductor unit is still a subassembly, I dip the germanium bar and base lead into a sodium dispersion contained within the dry box. This dispersion is contained in a hermetically sealed container which is opened only directly prior to the dipping of the germanium bar. After dipping this subassembly into the sodium dispersion, it is placed inverted into its surrounding container, also inverted. This container has a preformed solder ring about its open end portion. The container in its inverted state is mounted in a copper heat-sink so as to be maintained cool, while a radio-frequency coil surrounding the solder ring and base 2 is rapidly energized to heat the area quickly, melt the solder and thereby form the hermetically sealed unit. The dispersion is preferably added in sufficient quantity to insure an excess of unreacted sodium over that which is required to combine with moisture which might be present. This, for a transistor of the type described, is two or three drops of a 20% sodium dispersion, by weight, in a silicone oil.

It is apparent that this latter described stage of treating the semiconductor with the sodium dispersion under dry-box conditions may be readily adapted to other semiconductor devices wherein the same problems of moisture control are encountered. The problem is, of course, particularly acute with a junction device because of the very small dimensions of the central portion of the junction. However, it is apparent that this problem would also be a critical one with point-contact transistors because of the small spacing between the contacts of the emitter and collector electrodes. It will, of course, be obvious that there is no difference between dipping the subassembly unit into the dispersion, or having the dispersion already contained within the outer case.

Several methods may be used for treating the semiconductor subassembly before final hermetic sealing. Thus, the inside surface of the container 10 may be coated with a paste or resin *9a* containing the active water-reactive substances dispersed therein. Both coatings 9 and *9a* may be employed in the same device or either coating separately as may be desired. Also, this substance may be contained on an inert solid carrier in a finely dispersed state. Many other variations for practicing this invention will suggest themselves. However, I have found that where a solid carrier is used, extreme care must be exercised to completely dehydrate this carrier or it will actually serve as a source of moisture to the semiconductor element. This is because the amount of moisture remaining on the semiconductor element to be removed is believed to be but one or two molecules thick. I have found that while the foregoing methods may be considered as possibilities within the scope of my invention for bringing and maintaining the chemical substance in continual contact with the water vapor present, it is preferable to disperse the water-reactive chemical in an inert nonpolar liquid. Such substances as activated carbon or silica gel or other desiccants which depend primarily upon physical adsorption or hydrate formation and which maintain equilibrium conditions with the water vapor adsorbed, are not considered desirable for the purposes of this invention. This is because the amount of water to be adsorbed, if the semiconductor is fabricated under relatively dry conditions, is very minute. These equilibrium desiccants may actually under such conditions contribute moisture to the semiconductor element. However, a substance which combines chemically with the moisture does so irreversibly. Therefore, additional moisture is drawn from the semiconductor surface to restore equilibrium conditions, and further chemical combination occurs. Ultimately, all the moisture present is chemically combined. This method is effective even where the semiconductor is contained within a plastic casing 8 because such substances are known to be permeable to the transmission of water vapor therethrough. The semiconductor may also be directly treated with the alkali-metal dispersion, omitting the step of enclosing the semiconductor element in a protective plastic casing 8. However, since the alkali metal is equally effective in combining with moisture whether or not the water-vapor permeable plastic is present, the inclusion of additional protection against other contaminants afforded by the presence of the plastic casing is preferable.

Among the most suitable water reactors are the alkali metals and the alkali-metal hydrides. These substances are highly reactive in the presence of moisture and readily combine therewith to liberate hydrogen. However, to function satisfactorily, these substances must be in a highly dispersed form so as to present as great a surface as possible in the limited volume in which they are present. For example, sodium in undispersed form such as in the extruded-wire form, after a brief reaction with water vapor becomes coated on its surface with a layer of sodium hydroxide and is quickly inactivated and no longer reacts with water vapor.

The alkali metals such as lithium, sodium, potassium, rubidium and cesium and their respective hydrides may be prepared in dispersed form by various methods. Thus, an alkali-metal dispersion, particularly one of lithium, sodium or potassium, can be produced by putting a lump of the metal in a suitable liquid, such as toluene, a silicone oil or a fluorocarbon oil, heating the mixture above the melting point of the metal and vigorously stirring. The dispersion is kept agitated during the time that the liquid is cooled to room temperature, whereupon the metal remains fairly permanently dispersed in a finely divided state.

Many liquids ordinarily used as solvents may be used for preparing alkali metal dispersions. Thus, in the publication "Sodium Dispersions" issued by National Distillers Products Corporation, copyright 1953, the preparation of sodium dispersion formulations have a sodium content of 50% by weight and an average particle size of 5–15 microns is disclosed for 28 different liquids. While not all of these liquids may be used for the purposes of this invention, the suitability of the particular liquid for preparing a suitable alkali-metal dispersion may be readily determined by various considerations which will be readily apparent to those skilled in this art. Thus, an inert nonpolar liquid should be used. A liquid having too high a viscosity may prove undesirable because of lack of ease of handling. Furthermore, a liquid having a specific gravity which differs markedly from that of the dispersed metal does not make for as stable a dispersion as one wherein the specific gravity of both the alkali metal and the dispersing liquid therefor are similar. The liquids considered suitable for preparing dispersions of alkali metals and alkali-metal hydrides include isooctane, heptane, toluene, n-octane, xylene, n-butyl ether, tetralin, silicone oils, fluorocarbon oils and the like.

In Table I are listed the melting points and specific gravities of the alkali metals and the alkali-metal hydrides. From this table it will be seen that it is preferable for the purposes of this invention from the point of view of ease of handling to avoid the use of very low melting substances such as cesium which may exist in a molten state at room temperature.

TABLE I

*Properties of alkali metals and their hydrides*

| Alkali Metals and Hydrides | Melting Point, ° C. | Specific Gravity |
|---|---|---|
| Li | 186 | 0.53 |
| Na | 97.5 | 0.97 |
| K | 62.3 | 6.87 |
| Rb | 38.5 | 1.53 |
| Cs | 28.5 | 1.87–1.90 |
| LiH | 680 | 0.82 |
| NaH | 800 decomp | 0.92 |
| KH | decomp | 1.45 |
| RbH | 300 decomp | 2.0 |
| CsH | decomp | 2.7 |

This is because in such a condition, a fine dispersion is difficult to obtain because the particles of molten metal tend to coalesce together. Also, economic considerations preclude the desirability of using comparatively rare and expensive substances such as rubidium and cesium in the absence of unique results obtained therewith. Furthermore, purely on a stoichiometric basis, aside from other considerations, it is seen that the use of the alkali metals is preferable in this invention to that of their hydrides. Thus for each mole of water reacted with, the alkali metals liberate half a mole of hydrogen. The alkali-metal hydrides correspondingly liberate a mole of hydrogen. Also, because of the relatively high melting points of the alkali-metal hydrides, dispersions of these hydrides cannot be prepared by use of the relatively simple technique mentioned of melting the metal in a liquid under conditions of continuous stirring. Other dispersion methods must be used. Therefore, I prefer to prepare dispersions of lithium, sodium and potassium in an inert liquid. I find sodium particularly preferable because of its commercial availability, melting point and specific gravity. Thus, I prefer to prepare and use a dispersion of sodium in a liquid such as polymethylsiloxane which is commercially available as Dow DC–200 liquid. I find this liquid particularly useful because of its chemical inertness and stability and because its specific gravity is so similar to that of sodium. Consequently very stable dispersions are obtained. It should be understood that in the practice of this invention true molecular solutions are not obtained. The liquids employed act in all instances as dispersing agents rather than as solvents. As mentioned heretofore, the sodium dispersion is readily produced, for example, by putting a 5 gram piece of sodium in 10 grams of the silicone oil, heating to a temperature above 100° C. and vigorously stirring. The stirring is maintained while the liquid is cooled to room temperature. It is then immediately transferred to a glass jar and sealed. Once the dispersion is used for treatment of a batch of semiconductor devices in the dry box, it is discarded to guard against possible inactivation of the alkali metal.

While various techniques are known for preparing metals of a high melting point in a dispersed state, i.e., disintegration methods, colloid grinding, ultrasonic cavitation and the like, I do not consider that these afford any advantages in the working of my invention in preference to the use of the alkali metals. Thus, while it is known, for example, that the alkali-metal hydrides and the alkaline-earth metals are chemically reactive with water, and hence fall within the purview of this invention, their melting points preclude their preparation in dispersed form by the metal-melting method above mentioned. Thus, although they may be prepared in dispersed form by a disintegration technique, such as grinding or ultrasonic cavitation, their affinity for water being less than that of the alkali metals, the latter are the preferred embodiments for the practice of this invention.

It is apparent that an essential feature of this invention consists in providing a substance chemically reactive with water and non-deteriorating to the semiconductor so as to react with water vapor present in the semiconductor structure. Thus, the water-reactive substance need not be in actual contact with the semiconductor but may be part of the enclosure structure. A liquid dispersion is preferred, however, for ease of handling and moisture-absorbing efficiency. The concentrations of dispersed alkali metal used are not considered critical as these may be readily determined by those skilled in this art. Thus the viscosity of the dispersing medium will, to some extent, determine the concentration of metal used. Concentrations of sodium from 15% to 50% have been employed in the polymethylsiloxane solvent with satisfactory results. Similarly, the particle size of the dispersed metal is not critical inasmuch as this affects only the relative efficiency of the process rather than its operability. Particles as large as 1 or 2 millimeters in diameter have been used, although finer-sized particles are preferable. By the term "finely dispersed," I include for the purposes of this invention dispersed particles having a diameter at least below one millimeter and as low as one-hundredth of a micron or smaller.

In Fig. 2 are shown the results obtained by treating a germanium grown-junction transistor subassembly with the preferred embodiment of this invention, namely, a sodium dispersion in DC–200 silicone oil. One method of determining the efficacy of the water-activatable substance used is to determine the improvement in surface leakage obtained by practice of the subject invention. Thus, a troublesome phenomenon, normally referred to as channeling or floating potential, occurs with grown-junction and other type transistors. This phenomenon is characterized by the manifestation of an electric potential between the emitter and base electrodes of the transistor when a moderate potential, for example, 10 volts, is applied between the collector and base electrodes. It is believed that the magnitude of this floating potential is directly related to the useful life and reliability of the transistor. It is further believed that where a fixed potential is applied in the collector base circuit and the potential in the emitter base circuit increases with time, this phenomenon is due to the presence of polar molecules on the surface of the semiconductor in the base region. The presence of these polar molecules is directly attributed to the presence of water vapor. In Fig. 2 are shown the results obtained with two sets of grown-junction transistors processed under identical conditions with the exception of a portion of these devices being additionally treated by the process of the subject invention. Results based upon a statistical distribution have been presented, because comparisons between one or two devices can be highly inaccurate and misleading. Four bar graphs have been plotted representing median values obtained for a total of approximately 25 untreated and treated transistors before and after simulated aging. The simulated aging consisted essentially of maintaining the transistors at an elevated temperature of approximately 70° C. for a period of sixteen hours. Comparing graph A and graph C, it is seen in graph C that the sodium-treated grown-junction transistors had an initial median floating potential value of approximately 100 millivolts. This is considered the maximum desirable limit for floating potential. The untreated transistors had a median value of 340 millivolts. After simulated aging, the median floating potential value of the untreated transistors as shown in graph B increased markedly to 2 volts. The median floating potential value after aging of the sodium-treated transistors, as shown in graph D, dropped to 30 millivolts. It is seen from the foregoing that those devices treated with the sodium dispersion show a marked decrease in both initial and final values of floating potential, whereas those prepared under regular conditions show a poorer initial floating potential and a definite increase in floating potential following conditions of simulated aging. This is a clear-cut statistical demonstration of the significantly improved results obtained with the subject invention.

While I have described above the principles of my invention in connection with specific products and method steps, it is to be clearly understood that this description is made only by way of example and not as a limitation to the scope of my invention as set forth in the objects thereof and in the accompanying claims.

I claim:

1. A method of treating a semiconductor device to eliminate moisture present within the container thereof comprising including an alkali metal dispersed in an insulating medium within the container and in association with the semiconductor element of said device.

2. A method according to claim 1 wherein said alkali metal is sodium.

3. A method according to claim 1 wherein said alkali metal is potassium.

4. A method according to claim 1 wherein said alkali metal is lithium.

5. A method of preparing a germanium junction transistor including the steps of preparing a semiconductive germanium crystal, immersing the germanium crystal in a liquid containing an alkali metal dispersed therein and thereafter hemetically sealing said crystal within a container.

6. A method according to claim 5 wherein said alkali metal dispersion is sodium dispersed in polymethylsiloxane.

7. A semiconductor device including a semiconductive crystal, a quantity of an alkali metal dispersed in an insulating medium, and a sealed container enclosing said crystal and said alkali metal dispersed in an insulating medium.

8. A device according to claim 7 wherein said alkali metal is sodium.

9. A device according to claim 7 wherein said alkali metal is dispersed in an organic substance.

10. A device according to claim 7 wherein said alkali metal dispersion is sodium dispersed in polymethylsiloxane.

11. A device according to claim 10 wherein said semiconductive crystal is germanium.

12. A method of preparing a semiconductor device including the steps of preparing a semiconductive crystal, immersing the crystal in a liquid containing an alkali metal dispersed therein and thereafter hermetically sealing said crystal within a container.

13. A method of treating a semiconductor device to eliminate moisture present within the container thereof comprising including a material taken from the group consisting of alkali metals and alkali metal hydrides dispersed in an insulating medium within the container and in association with the semiconductor element of said device.

14. A semiconductor device including a semiconductive crystal, a quantity of a material taken from the group consisting of the alkali metals and alkali metal hydrides dispersed in an insulating medium, and a sealed container enclosing said crystal and said nonconducting dispersion of a material taken from said group.

References Cited in the file of this patent

UNITED STATES PATENTS

| | | |
|---|---|---|
| 1,172,568 | Schroter | Feb. 22, 1916 |
| 1,626,235 | Gustin | Apr. 26, 1927 |
| 1,958,967 | Kniepen | May 15, 1934 |
| 2,686,279 | Bartin | Aug. 10, 1954 |
| 2,820,931 | Koury | Jan. 21, 1958 |